Feb. 3, 1953    J. GABLER    2,627,365
CREAM BOX
Filed Feb. 25, 1948

INVENTOR
JOSEF GABLER

BY
*Semmes, Keegin, Robinson & Semmes*
ATTORNEYS

Patented Feb. 3, 1953

2,627,365

UNITED STATES PATENT OFFICE 2,627,365

CREAM BOX

Josef Gabler, Zurich, Switzerland

Application February 25, 1948, Serial No. 10,869

4 Claims. (Cl. 222—326)

This invention relates to a container for dispensing pasty substances and more particularly to such a container having an interchangeable inner container. This application is a continuation-in-part of my copending application, Serial Number 690,779, filed August 15, 1946.

In one form of this invention the container is of suitable size and construction to hold cold cream or other creams of the cosmetic industry and may be suitably placed on a table or shelf, for example in a beauty parlor or a powder room, where its contents are employed for the health and beauty of the skin or teeth. In a modified form of my invention, the container is of suitable size and design to be carried in a lady's handbag.

One of the objects of my invention is to provide a container for a creamy or pasty substance, which is to be discharged from time to time in small amounts in relation to the total content of the container.

Another object of my invention is to provide a cream box of simple construction which can be operated with one hand.

A further object is to provide a cream box having a maximum useful content for the substance.

Still another object is to provide a container for pasty substances which is so constructed that an inner container can be inserted therein, without requiring alignment of the inner container while it is being inserted, and the contents of the inner container can then be discharged.

A still further object of my invention is to provide a simple, resilient means in an outer container for holding firmly a replaceable inner container.

Still other objects will be apparent from the following description, when read in connection with the accompanying drawing, in which.

Like reference characters refer to like parts throughout the several figures of the drawing.

Figure 1:
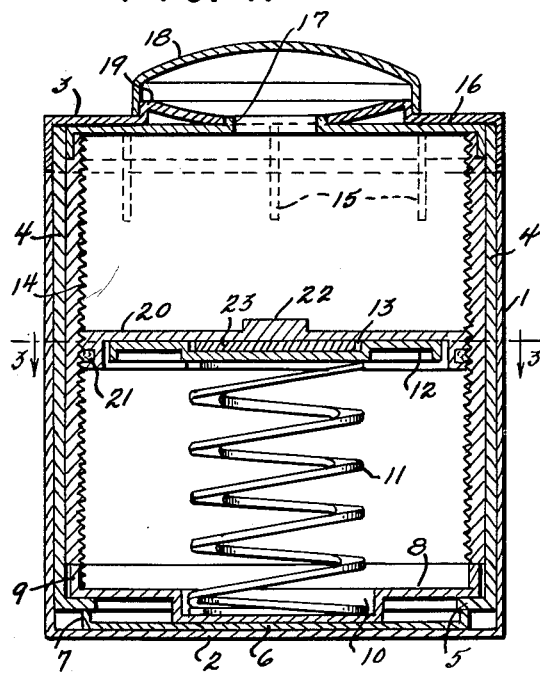
Figure 1 is a vertical sectional view of one form of a container embodying my invention.

In Figure 1 of the drawing, the numeral 1 designates the outer casing of a container having a bottom part 2, which may be either integral with or attached to the casing 1. A cover 3, of the same diameter as the outer casing 1, is adapted to fit against the upper surface of the casing. A cylindrical lining or housing 4 is designed to fit inside the casing 1 with enough clearance to permit relative rotation of the housing and the casing. At its lower end, the housing 4 is turned inwardly to form a flange 5.

A disk 6 is secured to the upper surface of the bottom 2 of the container by welding, soldering or other suitable means. The disk 6 is turned upwardly on its periphery to form a flange 7. Another disk 8 is secured, as by welding, soldering or the like, to the top of the disk 6 and is turned upwardly at its ends to form a rim 9. The disk 8 is formed with a recess 10 in its center. The relationship between the parts is so designed that the flange 5 of the housing 4 protrudes between the rim 7 of the disk 6 and the disk 8, being held thereby against movement in an axial direction but being permitted to rotate with respect thereto.

Figure 3:
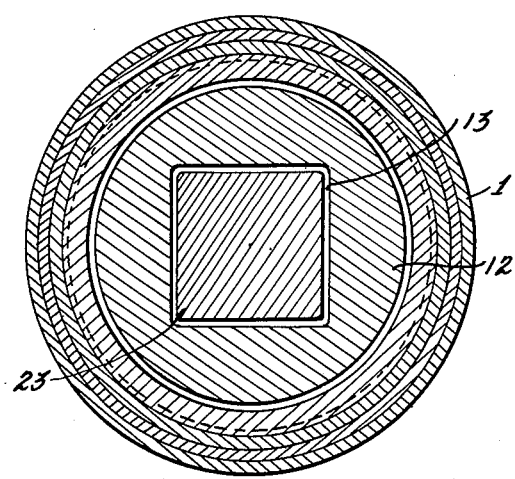
Figure 3 is a horizontal sectional view on the line 3—3 of Figure 1.

A coil spring 11, of flat cross section, is secured to the top of the disk 8 inside the recess 10 thereof by welding, soldering or other suitable means. The coil spring may be formed from sheet metal and has considerably more width in a radial direction than thickness in an axial direction. To the upper end of the coil spring 11 is secured a disc 12 having in the center of its upper surface a recess 13. This recess is illustrated in Figure 3 to be of square shape, but any nonround shape would be suitable. One particular design which is satisfactory for the recess 13 is a star shape.

A replaceable inner container is so proportioned as to fit snugly inside the housing. The housing 4 has in its upper part a plurality of longitudinal slits 15 extending downwardly from the top thereof. After the inner container has been put in place, the cover 3 for the outer container is put in place, encircling the housing 4 as the cover comes in contact with the top of the outer casing 1. The cover compresses slightly the top of the housing, which, by virtue of the slits 15, is resilient and is forced slightly inward to grasp firmly the cylindrical wall 14 of the inner container. The inner container is closed at its top by a cover 16 fitting into a peripheral recess at the top of the cylinder 14. The cover 16 is flanged slightly upwardly near its center to form a central aperture 17, the flange of the aperture fitting closely inside an aperture in the cover 3 of the outer casing. An outer cap 18 may be provided to fit over the rim of a central protuberance 19 of the cover 3.

The inner surface of the cylindrical wall 14 of the interchangeable inner container is threaded throughout its entire length and in threaded engagement therewith is a plate or piston 20. If desired, a recess may be provided in the periphery in the plate 20 to hold a gasket or washer 21 for preventing the escape of paste from one side of the plate to the other. A round projection or knob 22 may be formed in the center of the upper surface of the plate 20 of such size as to project into the aperture 17 in the cover 16 when the plate 20 is at the upper end of the inner container. The purpose of the projection 22 is to effect a complete emission of the cream from the inner container.

A small keying disk 23 is secured by welding, soldering or other suitable means to the center of the lower surface of the plate 20. This disk 23 is illustrated as being square in shape to fit inside the recess 13 in the disk 12. Of course, the disk 23 may be of any nonround shape, providing it conforms to the shape of the recess 13.

Figure 2:
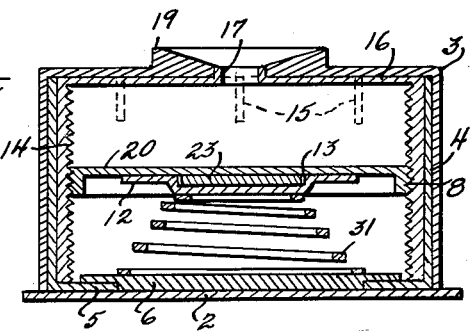
Figure 2 is a vertical sectional view of a modified form of a container also embodying my invention.

A modified form of a container embodying my invention which is particularly suitable for carrying in ladies' handbags is illustrated in Figure 2. This container is of appreciably smaller size than the container illustrated in Figure 1 and includes a casing bottom part 2, onto which a cup-shaped cover 3 is adapted to fit. A cylindrical lining or housing 4 is adapted to fit within the cylindrical cover 3 with a fairly tight fit to prevent relative rotation of the cover and the housing. At its lower end, the housing 4 is turned inwardly to form a round flange 5.

Figure 4:
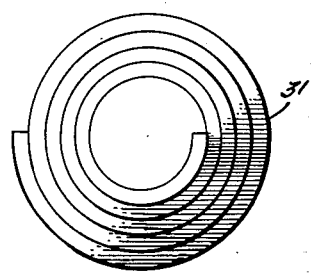
Figure 4 is a plan view of the coil spring illustrated in Figure 2.

A round disk 6 is secured to the upper surface of the bottom 2 of the container by welding, soldering or other suitable means. The disk 6 is provided with a round peripheral recess into which the flange 5 of the housing 4 fits. To the upper surface of the disk 6 a coil spring 31 of flat cross section is secured, as by welding, soldering or other suitable means. As illustrated in Figures 2 and 4, this spring 31 is formed with its turns in a spiral, so that, when fully compressed, each turn lies inside the next lower turn. As in the case of the coil spring 11 illustrated in Figure 1, the spring 31 may be made from sheet metal and has considerably more width in a radial direction than thickness in an axial direction.

To the upper end of the coil spring 31 is secured, by suitable means, a disk 12, having a nonround recess 13 therein. The recess 13 may be of any desired shape other than round, but is preferably in the shape of either a square or a star. A replaceable inner container having a side wall 14 is dimensioned so as to fit snugly within the housing 4. A plurality of longitudinal slits 15 are provided in the housing 4, extending downwardly from the top thereof. When the inner container is put in place inside the housing 4 and the cover 3 is forced down about the housing, the cover compresses the housing 4 slightly inwardly against the side wall 14 of the inner container, with the result that the inner container is secured against rotation relative to the cover 3.

The inner container is provided with a top 16 having in its center an aperture 17 formed by a flange in the top. The flange of the aperture 17 fits closely within an aperture in the cover 3. A central protuberance 19 having a dished out center is formed in the cover 3 about the aperture 17 of the inner container.

The inner container is closed at its bottom by a plate or piston 20, which is threaded on its periphery to engage threads on the interior of the cylindrical wall 14 of the inner container. A small keying disk 23 is secured by any suitable means to the lower surface of the plate 20. The disk 23 is of appropriate shape to fit within the recess 13 in the disk 12.

It will be appreciated that there is provided by my invention a container for dispensing pasty substances in which a replaceable inner container of maximum size may be used. This is so because of my use of a coil spring of flat cross section to transmit rotational torque. The coil spring, being preferably made of flat sheet metal, has considerably more radial width than axial thickness and accordingly occupies a minimum of axial space in the outer casing when it is fully compressed, which is when the replaceable inner container is full. This advantage of maximum utilization of space in the outer container is present especially in the modification of the invention illustrated in Figures 2 and 4, where the turns of the coil spring are compressed into a single plane when the spring is fully compressed.

Another advantage of using a spring of flat cross section to transmit rotational torque is that such a spring transmits the torque with a minimum of distortion, whereas a spring of round cross section readily becomes twisted out of shape.

Another advantage of the container of my invention is that it is so designed as to be operable by only one hand. In the case of the container illustrated in Figure 1, the outer casing 1 is held in the palm of the hand while the cover 3 is rotated by the thumb and forefinger of the same hand. By rotating the cover 3 relative to the casing 1, the plate or piston 20 is caused to rotate relative to the inner container wall 14, thereby causing the piston 20 to move axially of the inner container and to cause discharge of paste through the aperture 17. In the case of the container illustrated in Figure 2, the bottom part 2 of the casing may be held in the palm of the hand. If desired, the periphery of the bottom 2 may be knurled. The cover 3 is rotated by the thumb and forefinger relative to the bottom 2 and axial motion of the plate or piston 20 is effected to cause emission of paste through the aperture 17.

Due to the provision of the nonround disks 23 engaging the recesses 13, it will be apparent that there is provided by this invention a container in which inner containers may be replaced with facility. When inserting the inner container, it is not necessary to align it with any portion of the outer casing because a small amount of rotation of the disk 23 relative to the recess 13 will cause them to engage each other. It is clear that this feature provides a very convenient means for renewing the contents of the container.

It will be readily understood that a container made in the manner of my invention provides a means for dispensing a pasty substance with a very accurately measured and controlled amount of emission. Accordingly, the exact quantity of paste desired to be used may be extruded from the container. If an excess of paste is extruded, it may be drawn back into the container by simply reversing the direction of relative rotation of the parts.

I claim:

1. A container for pasty substances comprising an outer casing, a cover for said casing, a cylindrical housing inside said casing and rotatable relative to the casing, an interchangeable inner container inside said housing having a threaded inner wall, a piston in screw-threaded engagement with the threaded inner wall of said inner container for extruding the contents of said inner container, and means for causing relative rotation of said piston and said inner container, said means including at least one disk secured to the bottom of said casing, and a member connecting the disk and piston in nonrotatable relationship, said disk being circumferentially recessed to receive a flange on said cylindrical housing, thereby securing the housing against longitudinal movement relative to the casing but permitting relative rotational movement therebetween, said housing being slitted at its upper end for resiliently binding said inner container to said cover.

2. A container for pasty substances comprising an outer container, an interchangeable inner container having a threaded inner wall, a piston for extruding the contents of said inner container and means for changing the position of said piston in the inner container comprising screw threads on the periphery of said piston engaging the screw threads on the inner periphery of said inner container, and a coil spring drivingly engaged between said piston and a part of said outer container for causing relative rotation of said piston and said inner container, said spring being of flat cross section and having its turns wound in a spiral so that upon complete compression of said spring its turns lie in a single plane.

3. A container for pasty substances comprising an outer container, an interchangeable inner container having a threaded inner wall, a piston in threaded engagement with the inner wall of the inner container for extruding the contents of said inner container and means for changing the position of said piston in the inner container including a coil spring of flat cross section secured to the piston and the casing and having its turns wound in a spiral so that upon complete compression of said spring by movement of the piston downwardly in the inner container its turns lie in a single plane, said coil spring of said cross-section adapted to rotate the piston integrally with the outer container and having the long dimension of the coils in substantially the plane of rotation.

4. A container for dispensing pasty substances comprising a casing, an inner container having threaded inner walls and rotatable relative to the casing, a piston threadedly engaging the inner walls of the inner container for movement longitudinally of the inner container upon relative rotation of the piston and the inner container, a coil spring fixedly secured at one end to the casing for actual movement therewith, the coils of said spring increasing in diameter along its length whereby the said coils lie substantially on a single plane when the piston is in its lowermost position in the inner container, a plate fixed to the other end of the spring defining an aperture, and a projecting member on the undersurface of the piston for insertion in the aperture detachably securing the piston, spring and casing in mutually rotatable relationship relative to the inner container.

JOSEF GABLER.

REFERENCES CITED

The following references are of record in the file of this patent:

UNITED STATES PATENTS

| Number | Name | Date |
| --- | --- | --- |
| 1,429,580 | Geiger | Sept. 19, 1922 |
| 1,670,178 | Zearing et al. | May 15, 1928 |
| 1,975,312 | Creveling | Oct. 2, 1934 |
| 2,009,761 | Calderara | July 30, 1935 |
| 2,477,875 | Hutchason | Aug. 2, 1949 |

FOREIGN PATENTS

| Number | Country | Date |
| --- | --- | --- |
| 531,026 | Germany | Aug. 6, 1931 |